United States Patent [19]
Eck et al.

[11] 4,280,280
[45] Jul. 28, 1981

[54] RADIUS PLATE STRUCTURE

[75] Inventors: Leonard F. Eck; Lyle Horgen, both of McPherson, Kans.

[73] Assignee: Kansas Jack, Inc., McPherson, Kans.

[21] Appl. No.: 77,647

[22] Filed: Sep. 21, 1979

[51] Int. Cl.³ .............................................. G01B 5/28
[52] U.S. Cl. ................................... 33/203.12; 104/44
[58] Field of Search ............... 33/203, 203.12, 203.14, 33/203.13; 104/44

[56] References Cited

U.S. PATENT DOCUMENTS

| | | | |
|---|---|---|---|
| 1,989,307 | 1/1935 | Bennett | 33/203.14 |
| 2,197,468 | 4/1940 | Graham et al. | 33/203 |
| 2,250,742 | 7/1941 | Bennett | 33/203 |
| 2,503,580 | 4/1950 | Fontaine | 33/203 |
| 3,143,810 | 8/1964 | McClendon | 33/203.12 |
| 3,161,965 | 12/1964 | Taylor | 33/203.12X |
| 3,875,672 | 4/1975 | Castoe | 33/203.12 |

*Primary Examiner*—William D. Martin, Jr.
*Attorney, Agent, or Firm*—Fishburn, Gold and Litman

[57] ABSTRACT

A radius plate structure for use in aligning a vehicle wheel resting thereon has a bottom plate member and an upper plate member positioned in overlying relation to the bottom plate member and connected thereto. A bearing cage is situated between the bottom plate member and the upper plate member and permits smooth rotational and translational movement of the upper plate member. The particular connection permits rotational movement while restricting translational movement to front to rear movement of the upper plate member relative to the bottom plate member. Rotation stopping connectors, such as a pin extending through an aperture and received in an elongate slot aligned front to rear, extend between the bottom plate member and the upper plate member and lock the upper plate member relative to the bottom plate member at a selected amount of rotation whereby only front to rear translational movement is permitted.

5 Claims, 8 Drawing Figures

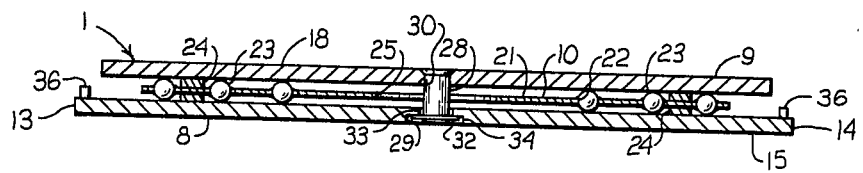
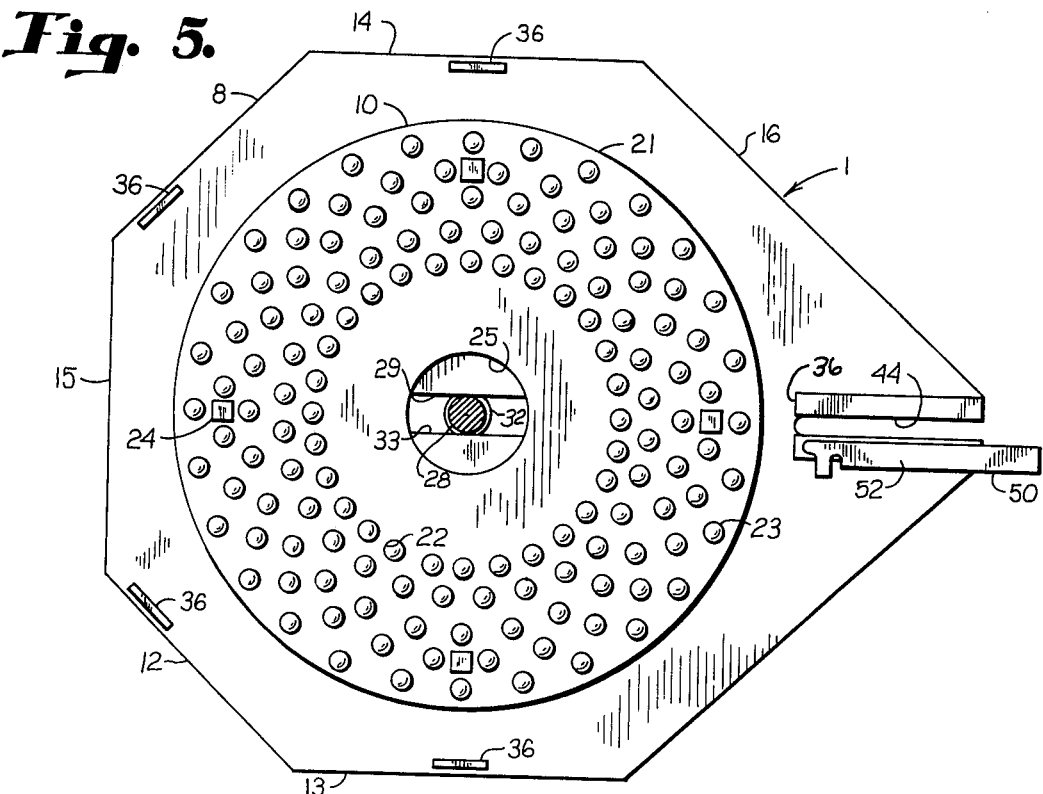
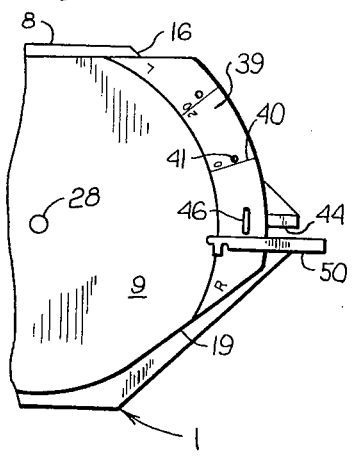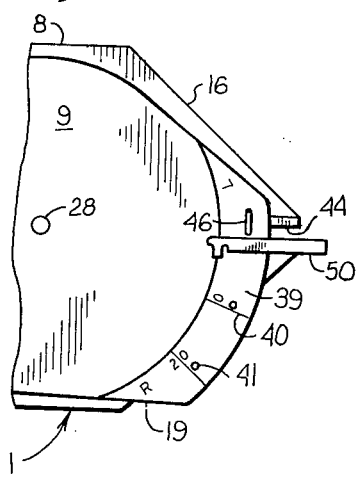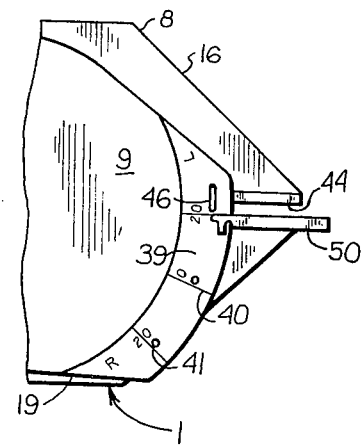

RADIUS PLATE STRUCTURE

This invention relates to structures and equipment for use in aligning vehicle wheels and in particular to a radius plate structure for supporting a wheel thereon during alignment operations.

During alignment of the wheels of a vehicle, such as by using such equipment and methods as disclosed in copending application for U.S. Pat. Ser. No. 940,823, now abondoned, caster settings must be checked and adjusted in case of deviation from the specified settings. Caster is a check of the turning radius geometry of the front wheels and, as is well known, the steering and wheel mounting structure of the vehicle causes the wheels to "heel over" during turns, or deviate from perfect vertical alignment for vehicle control during turns and steering wheel self centering while emerging from a turn.

The principal objects of the present invention are: to provide a radius plate structure for use in aligning a vehicle wheel positioned thereon; to provide such a radius plate structure having top and bottom plate members with a bearing cage situated therebetween for ease of movement of the top plate member relative to the bottom plate member; to provide such a radius plate structure in which the top plate member is connected to the bottom plate member in such a manner as to permit rotational movement and translational movement only from front to rear of the top plate member relative to the bottom plate member; to provide such a radius plate structure having a rotation stopping connector extending between the bottom plate member and the top plate member and in line with a radius of the top plate member from the rotational axis thereof and preventing rotational movement at a selected amount of rotation at the top plate member while permitting only front to rear translational movement; and to provide such a radius plate structure which is relatively inexpensive, highly reliable in use and well adapted for its intended purpose.

Other objects and advantages of this invention will become apparent from the following description taken in connection with the accompanying drawings wherein is set forth by way of illustration and example, a certain embodiment of this invention.

FIG. 4 is a sectional view taken along lines 4—4, FIG. 2.

FIG. 5 is a fragmentary, top plan view of the radius plate structure having a top plate member thereof removed for purposes of illustration.

FIG. 6 is a fragmentary, top plan view of the radius plate structure and showing the top plate member thereof rotated in one direction relative to the bottom plate member and stopped from further rotation.

FIG. 7 is a fragmentary, top plan view of the radius plate structure and showing the top plate member rotated in a second direction relative to the bottom plate member and stopped from further rotation.

FIG. 8 is a fragmentary top plan view of the radius plate structure and showing the top plate member stopped in rotation relative to the bottom plate member and translated rearwardly.

Figure 1:
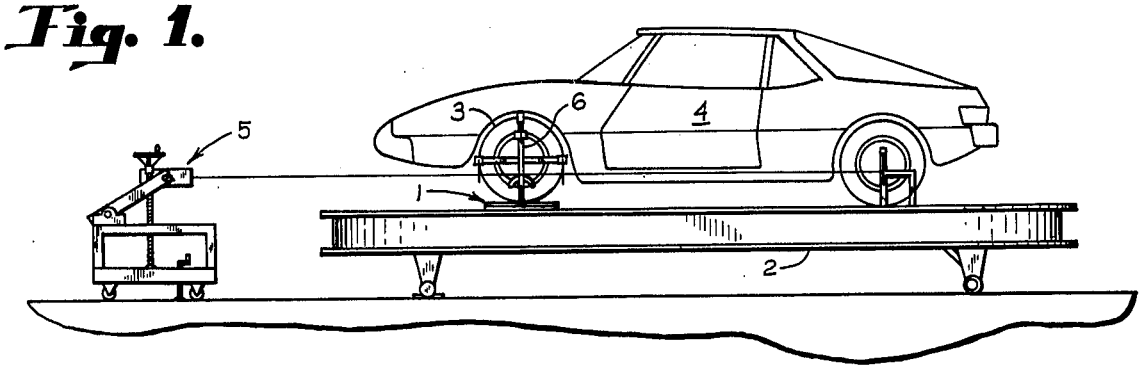
FIG. 1 is a front elevational view of a radius plate structure embodying this invention and which is positioned on a vehicle work rack structure and supporting a wheel of a vehicle thereon for alignment operations.
Figure 2:
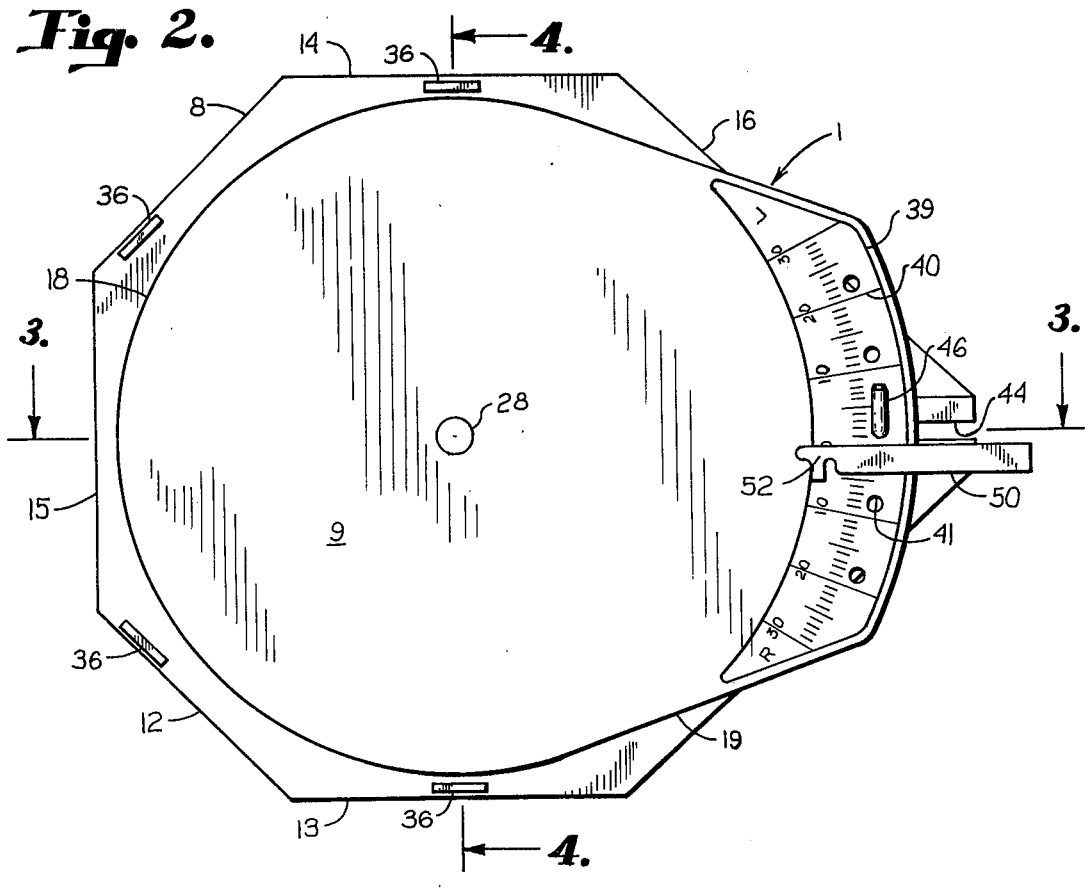
FIG. 2 is a top plan view of the radius plate structure.
Figure 3:
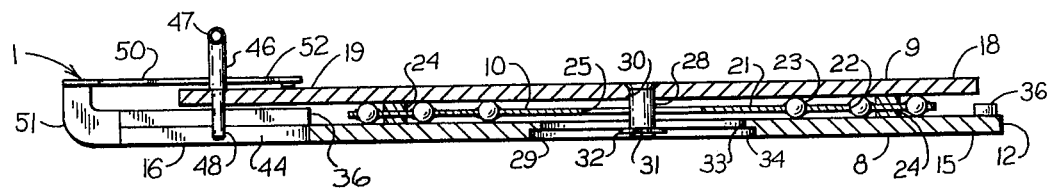
FIG. 3 is a sectional view taken along line 3—3, FIG. 2 and showing inner details of the structure.

As required, a detailed embodiment of the present invention is disclosed herein, however, it is to be understood that the disclosed embodiment is merely exemplary of the invention which may be embodied in various forms. Therefore, specific functional and structural details as disclosed herein are not to be interpreted as limiting, but merely as a Basis for the claims and as a representative basis for teaching one skilled in the art to variously employ the present invention in virtually any appropriately detailed structure.

Referring more in detail to the drawings:

The reference numeral 1 generally indicates a radius plate structure embodying the present invention and positioned atop a vehicle work rack structure 2 and with a wheel, such as a front wheel 3 of a vehicle 4 thereon.

Many types of vehicle work rack structures, such as the structure 2, can be used in conjunction with the radius plate structure 1 and alternatively, the radius plate structure 1 can be positioned directly upon a supportive floor surface and the wheel 3 positioned thereon. In the illustrated example, the radius plate structure 1 is used in conjunction with alignment equipment including a line of sight alignment apparatus such as shown in copending application for U.S. Pat. Ser. No. 940,823, now abandoned which includes a line of sight emitting means 5 and a target means 6 which is properly calibrated for alignment operations including measurements of runout, caster, camber and toe.

The radius plate structure 1 includes a bottom plate member 8 for contact with a supportive surface such as the floor or the work rack structure 2, a top plate member 9 positioned in overlying relation to the bottom plate member 8 and bearing means 10 situated between the bottom plate member 8 and the top plate member 9 and permitting smooth rotational and translational movement of the top plate member 9 on the bottom plate member 8. Connecting means extend between the bottom plate member 8 and the top plate member 9 and permit rotational movement while allowing translational movement only from front to rear of the top plate member 9 relative to the bottom plate member 8. A rotation stopping means extends between the bottom plate member 8 and the top plate member 9 and is along a line of radius of the top plate member 9 from the connecting means. The rotation stopping means selectively prevents rotational movement at a desired amount of rotation of the top plate member 9 while permitting front to rear translational movement.

In the illustrated example, the bottom plate member 8 has a generally hexagonal marginal portion 12 with opposed sides 13 and 14 and a rear portion 15. A front portion 16 projects forwardly and has a part of the rotation stopping means therewith as described below.

The top plate member 9 includes a rear semicircular portion 18 and a front portion 19 having remaining parts of the rotation stopping means therewith as described below.

The exemplary bearing means 10 includes a bearing cage with a plate portion 21 having a plurality of openings or sockets 22 arranged therearound and receiving respective ball bearings 23 therein of commensurate size with the openings or sockets 22. The ball bearings 23 are greater in diameter than the thickness of the plate portion 21 and are thereby capable of extending above and below the plate portion 21 to provide rolling or gliding movement of the top plate member 9 on the bottom plate member 8. To maintain the plate portion 21 spaced above the bottom plate member 8 and prevent the ball bearings 23 from falling through the openings or sockets 22, a plurality of protuberances or lugs 24 extend from opposite surfaces of the plate portion 21 to comprise a total thickness of the plate portion 21 including the lugs generally equal to the diameter of the ball bearings 23. The plate portion 21 includes an enlarged central opening 25 through which the connecting means extends.

In the illustrated example, the connecting means includes an axial shaft or pin member 28 extending from one of the plate members 8 or 9 and received in an elongate slot 29 in the other plate member 8 or 9. In the present example, the shaft or pin member 28 extends through a central or axially located bore 30 in the top plate portion 9 and is secured thereto, as by welding or the like to depend therefrom. The shaft or pin member 28 is of sufficient length to extend through the central opening 25 of the bearing means 10 and at least partially through a slot 29 in the bottom plate member 8. The shaft or pin member 28 has a lower end with an angular groove 31 for connection with a snap ring 32 which retains the shaft or pin member 28 in the slot 29. The elongate slot 29 has an upper section 33 and a lower section 34, the juncture between the sections 33 and 34 forming a step therearound upon which the snap ring 32 rides to prevent inadvertent disassembly or separation of the top plate member 9 from the bottom plate member 8.

The elongate slot 29 is centrally positioned in the bottom plate member 8 and has a longitudinal axis or long direction extending from front to rear, thereby permitting full rotational movement of the top plate member 9 relative to the bottom plate member 8 and only translational movement in a direction parallel to the longitudinal axis of the elongate slot 29, that is, only from front to rear and vice versa. Because the bearing means 10, upon translation of the top plate member 9 relative to the bottom plate member 8 tends to move twice as far as the movement of the plate members 8 and 9, the bottom plate member 8 is provided with upwardly projecting lugs 36 around the peripheral margins therof to limit translatory movement of the bearing means 10 and prevent loss of any ball bearings 23 from the openings or sockets 22.

The rotation stopping means extends between the bottom plate member 8 and the top plate member 9. In the illustrated example, the front portion 19 has a forward periphery comprising an arc spaced from the shaft or pin member 28 and with a scale face 39 affixed thereto such as by fasteners, glueing or the like and has indicia 40 thereon corresponding to or calibrated in degrees of radii from the shaft or pin member 28 which comprises the axis of rotation. Apertures 41 extend through the scale face 39 and the front portion 19 at selected degrees of radii, such as 0°, 10°, 20°, and 30° of turn in both left and right directions.

An elongate channel or opening 44 extends through the front portion 16 of the bottom plate member 8 and has a long dimension or longitudinal axis extending from front to rear and aligned in colinear relation with the longitudinal axis of the elongate slot 29. A pin member 46 having an upper portion 47 adapted for grasping is removably received in a selected one of the apertures 41 and extends therethrough and into the elongate channel or opening 44, thereby registering the selected aperture 41 with the elongate channel or opening 44 and locking the top plate member 9 in a selected angle of rotation with respect to the bottom plate member 8. The lower portion 48 of the pin member 46 is free to slide back and forth in the elongate channel or opening 44 which acts as a way therefor whereby the top plate member 9 is translatable only from front to rear while maintaining the selected degree of rotation.

A pointer 50 is mounted on one of the plate members 8 and 9 and indicates the scale indicia on the other plate member 8 or 9. In the illustrated example, the pointer includes a lower portion 51 secured to the front portion 16 of the bottom plate member 8 adjacent the elongate channel or opening 44 thereof. An upper portion 52 of the pointer 50 extends over the scale 39 and has an edge extending in parallel relationship with the corresponding edge of the elongate channel or opening 44 whereby, when an indicia 40 aligns with the edge of the upper portion 52, the appropriate aperture 41 is in registration with the elongate opening 44 therebelow to accomodate entrance of the pin member 46. In the illustrated example, the scale indicia 40 are offset from the respective apertures 41 so as to align the indicia with the pointer 50 and the aperture 41 with the elongate channel or opening 44 at the proper radius.

In the use of the radius plate structure 1, the vehicle wheel 3 is positioned in straight ahead relation to the vehicle 4 and centered upon the shaft or pin member 28 of the connecting means for rotation of the top plate member 9. The vehicle wheel 3 is aligned with the radius plate structure 1 so that the axis of rotation thereof is parallel to the longitudinal axis of the elongate slot 29 and the elongate channel or opening 44 or, in other words, so that the wheel face is at a right angle to the elongate opening 44. During alignment procedures, which in detail are beyond the scope of this disclosure, the wheel 3 must be turned left then right to make measurements therefor such as caster. Typically, such measurements call for the front wheel to be measured at a 0° turn, corresponding to the 0° mark on the scale face 39, and then turned 20° left and right, corresponding to the 20° left and right indicia 40 on the scale face 39. While in the straight ahead or 0° position and in the 20° of turn positions, various adjustments on the wheel suspension structure are accomplished if necessary and during these adjustments, it is preferable that the wheel be rigidly maintained in a set amount of rotation yet be free to move in and out or front to rear as necessary to accommodate changes in the steering geometry resulting from the adjustments.

To lock the radius plate into a straight ahead position, the pin member 46 is placed through the 0° aperture 41 and into the elongate channel opening 44, thereby positioning the top plate member 9 in a zero amount of rotation yet permitting front to rear translational movement. When it is desired that the wheel 3 be steered, the pin member 46 is removed and the wheel turned either by hand or by using the steering wheel into a 20° right or left turn as desired. The pin member 46 is inserted through the appropriate 20° aperture 41 and into the elongate channel or opening 44 thereby locking the top plate member 9 in 20° of rotation relative to the bottom plate member 8 and permitting front to rear translational movement thereof, FIGS. 7 and 8.

When it is desired to turn the front wheel 3 in the other direction, the pin member 46 is removed and the front wheel turned 40°, or 20° past the 0° indicia, and to the 20° indicia in the other direction and the pin member 46 replaced in the appropriate aperture 41 and into the elongate channel or opening 44.

Use of the radius plate structure 1 positively positions the top plate member 9 into a fixed rotational position relative to the bottom plate member 8 yet permits front to rear translational movement. Although 20° has been used as a representative figure for turning the wheel 3 to make appropriate measurements, 10°, 30° or virtually any number of degrees can be used where appropriate, such as when called for in a vehicle manufacturer's specifications.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A radius plate structure for use in aligning a vehicle wheel positioned thereon and comprising:
   (a) a bottom plate member having a front portion;
   (b) an upper plate member having front and rear portions and positioned in overlying relation to said bottom plate member;
   (c) connecting means extending between said bottom plate member and said upper plate member and including an elongate slot in one of said bottom and upper plate members and an axial pin extending from the other of said bottom and upper plate members permitting full rotational movement while limiting translational movement to only from front and rear of said upper plate member relative to said bottom plate member;
   (d) bearing means situated between said bottom plate member and said upper plate member and permitting smooth rotational and translational movement of said upper plate member on said bottom plate member; and
   (e) rotation stopping means including a pin member detachably engaged with one of a plurality of apertures extending through one of said bottom and upper plate members and an elongate opening in the other of said bottom and upper plate members and colinearly aligned with said elongate slot, said aperatures corresponding to a plurality of selected radii of said upper plate member from said axial pin; said rotation stopping means selectively preventing rotational movement at a selected amount of rotation of said upper plate member relative to said bottom plate member and permitting only front to rear translational movement at said selected amount of rotation.

2. The radius plate structure set forth in claim 1 wherein:
   (a) said one of said bottom and upper plate members having said apertures extending therethrough has a scale indicating the degrees of radius of each of said apertures from said axial pin; and including
   (b) a pointer mounted on the other of said bottom and upper plate members in adjoining relation with said elongate opening and extending toward said scale for indicating one of said apertures in registration with said elongate opening.

3. The radius plate structure set forth in claim 1 wherein:
   (a) said bearing means is a bearing cage member having a bearing plate member with a plurality of sockets therethrough receiving respective ball bearings; and
   (b) said bearing cage is mounted for movement between said bottom and upper plate members.

4. The radius plate structure set forth in claim 3 wherein:
   (a) said sockets extend through said bearing plate member and are of a size commensurate with the size of said ball bearings;
   (b) a plurality of supporting lugs are affixed to said bearing plate member and contact said bottom plate for supporting said bearing plate member in spaced relation to said bottom plate member;
   (c) an enlarged central opening extends through said bearing plate member with said connecting means extending therethrough; and
   (d) a plurality of lugs extend upwardly from said bottom plate member and limit translational movement of said bearing cage member on said bottom plate member.

5. A radius plate structure for use in aligning a vehicle wheel positioned thereon and comprising:
   (a) a bottom plate member with a central elongate opening and a front portion having an elongate slot with long axes of said elongate opening and said elongate slot being in colinear alignment; said bottom plate member having peripheral portions with lugs protruding upwardly therefrom;
   (b) a bearing cage member positioned in overlying relation to said bottom plate member and including a bearing plate portion with ball bearings fitted thereto and having an enlarged central opening; the bearing cage member being rotatable and translatable relative to said bottom plate member and contacting said lugs to limit translational movement thereof;
   (c) an upper plate member of commensurate size with said bottom plate member and having front and rear portions and positioned in overlying relation to said bottom plate member with said bearing cage members therebetween said upper plate member having an axial shaft depending therefrom extending through said central opening and said elongate opening and engaged with said bottom plate member for rotational movement and only front to rear translational movement of said upper plate member relative to said bottom plate member; said front portion having a scale thereon calibrated in degrees of radii from said axial shaft and having apertures therethrough at a plurality of selected degrees of radii; and
   (d) a pin member removably received in a selected one of the apertures of said scale and extending therethrough and into said elongate opening to register said selected one aperture with said elongate opening and lock said upper plate member in a selected angle of rotation with said upper plate member being non-rotatably affixed and freely translatable from front to rear whereby a wheel positioned on said radius plate structure is positionable in a selected degree of rotation and translatable only from front to rear and rear to front while maintaining said selected degree of rotation.

* * * * *